(12) United States Patent
Tokumaru et al.

(10) Patent No.: US 10,890,151 B2
(45) Date of Patent: Jan. 12, 2021

(54) HIGH-PRESSURE FUEL PUMP

(71) Applicant: Hitachi Automotive Systems, Ltd., Hitachinaka (JP)

(72) Inventors: Kazuaki Tokumaru, Hitachinaka (JP); Masahiko Hayatani, Hitachinaka (JP); Satoshi Usui, Hitachinaka (JP); Atsuji Saito, Hitachinaka (JP); Kenichiro Tokuo, Hitachinaka (JP); Masamichi Yagai, Hitachinaka (JP); Masayuki Suganami, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/603,072

(22) PCT Filed: Mar. 26, 2018

(86) PCT No.: PCT/JP2018/012144
§ 371 (c)(1),
(2) Date: Oct. 4, 2019

(87) PCT Pub. No.: WO2018/186219
PCT Pub. Date: Oct. 11, 2018

(65) Prior Publication Data
US 2020/0049116 A1 Feb. 13, 2020

(30) Foreign Application Priority Data
Apr. 7, 2017 (JP) ................................. 2017-076406

(51) Int. Cl.
*F02M 59/44* (2006.01)
*F16J 10/04* (2006.01)
*F04B 53/16* (2006.01)

(52) U.S. Cl.
CPC ........... *F02M 59/44* (2013.01); *F04B 53/168* (2013.01); *F16J 10/04* (2013.01)

(58) Field of Classification Search
CPC ........ F16J 10/04; F04B 53/168; F02M 59/44; F02M 59/48
See application file for complete search history.

(56) References Cited

U.S. PATENT DOCUMENTS

| 7,744,353 | B2 * | 6/2010 | Yamada | ............... | F02M 59/102 417/273 |
| 8,579,611 | B2 * | 11/2013 | Lucas | .................... | F02M 59/02 417/437 |

(Continued)

FOREIGN PATENT DOCUMENTS

| DE | 10322603 A1 | 12/2004 |
| EP | 3088725 A1 | 11/2016 |

(Continued)

OTHER PUBLICATIONS

International Search Report (PCT/ISA/210) issued in PCT Application No. PCT/JP2018/012144 dated Jul. 3, 2018 with English translation (four (4) pages).

(Continued)

*Primary Examiner* — Michael Leslie
(74) *Attorney, Agent, or Firm* — Crowell & Moring LLP (57) ABSTRACT

Provided is a high-pressure fuel pump which can fix a cylinder to a pump body using a simple structure, and can reduce a displacement amount inward in a radial direction of the cylinder. A high-pressure fuel pump includes a pump body which is formed with a pressing chamber and a cylinder which is inserted in a hole formed in the pump body. The cylinder is swaged to the hole by pressing a convex portion on an outside in a radial direction to fit into the hole on an opposite side to the pressing chamber, by screwing a formed screw thread into the hole, or by being (Continued)

swaged with the opposite side to the pressing chamber. The cylinder is formed with a clearance in the radial direction with respect to the hole of the pump body all over a region from a bonding portion to an upper end.

20 Claims, 7 Drawing Sheets

(56) References Cited

U.S. PATENT DOCUMENTS

| | | | |
|---|---|---|---|
| 10,273,920 B2* | 4/2019 | Lucas | F02M 59/025 |
| 10,378,524 B2* | 8/2019 | Saito | F02M 55/04 |
| 10,584,668 B2* | 3/2020 | Usui | F02M 59/48 |
| 2004/0052652 A1 | 3/2004 | Yamada et al. | |
| 2007/0071614 A1 | 3/2007 | Inoue | |
| 2009/0110575 A1 | 4/2009 | Munakata et al. | |
| 2014/0314601 A1 | 10/2014 | Tamura et al. | |
| 2018/0135581 A1 | 5/2018 | Usui et al. | |
| 2019/0128229 A1* | 5/2019 | Hashida | F02M 59/36 |
| 2019/0301414 A1* | 10/2019 | Usui | F02M 59/34 |
| 2019/0323465 A1* | 10/2019 | Saito | F02M 59/36 |
| 2020/0132029 A1* | 4/2020 | Akiyama | F02M 59/46 |

FOREIGN PATENT DOCUMENTS

| | | |
|---|---|---|
| JP | 2004-340052 A | 12/2004 |
| JP | 2007-120492 A | 5/2007 |
| JP | 2007-146862 A | 6/2007 |
| JP | 2009-108784 A | 5/2009 |
| JP | 2017066956 A | 4/2017 |
| WO | WO 2013/080253 A1 | 6/2013 |
| WO | WO 2017/038298 A1 | 3/2017 |

OTHER PUBLICATIONS

Japanese-language Written Opinion (PCT/ISA/237) issued in PCT Application No. PCT/JP2018/012144 dated Jul. 3, 2018 (four (4) pages).

European Search Report issued in Application No. EP18781834.9 dated Nov. 6, 2020 (7 pages).

* cited by examiner

HIGH-PRESSURE FUEL PUMP

TECHNICAL FIELD

The present invention relates to a high-pressure fuel pump for an internal combustion engine of a vehicle.

BACKGROUND ART

In an internal combustion engine of a direct injection type in which fuel is directly injected into a combustion chamber of the internal combustion engine, a high-pressure fuel pump is widely used to increase the pressure of the fuel. As a related art of the high-pressure fuel pump, there is a high-pressure fuel pump disclosed in JP 2009-108784 A.

The high-pressure fuel pump discloses, in Paragraph 0235, "a tip portion near a pressing chamber 12 of a large-diameter cylindrical portion 20B of a cylinder 20 is machined to a conical surface W21 of a convex shape, matched to a conical surface of a concave shape formed in an inner peripheral portion of the lower end in the drawing of a cylindrical portion 1SR of a pump housing 1, and both form a conical contact surface 21W". A diffusion bonding region (ring mash bonding) of the metals of the cylinder and the pump housing which are not melted by heat is formed on the bonding surface. (see Paragraph 0235 and FIGS. 6, 7, and 9).

CITATION LIST

Patent Literature

PTL 1: JP 2009-108784 A

SUMMARY OF INVENTION

Technical Problem

However, in the high-pressure fuel pump of the related art, a pump body is subjected to a ring mash bonding, that is, press contact in order to fix the cylinder. Therefore, there is a need to secure a facility for performing the press contact. For this reason, the costs are increased.

In addition, in recent years, the high-pressure fuel pump is requested for supplying fuel at a high fuel pressure. In particular, the fuel pressure of the pressing chamber of the high-pressure fuel pump needs to be increased. Therefore, the fuel becomes a high temperature as the fuel is increased in pressure, and thus an expanding amount of the cylinder becomes large. The inventors have found out that, in a case where the expanding amount of the cylinder becomes large, and the outer peripheral portion of the cylinder is fixed to the pump body in the vicinity of the pressing chamber, the cylinder is pressed inward in a radial direction from the pump body, and the cylinder moves inward in the radial direction.

Thus, the inventors have found out that a gap between the cylinder and a plunger which slides in the inner diameter side of the cylinder is narrow and comes into contact, and as a result there is a concern that the plunger is stuck.

Therefore, an object of the invention is to provide a high-pressure fuel pump which can fix a cylinder to a pump body using a simple structure, and can reduce a displacement amount inside in a radial direction of the cylinder.

Solution to Problem

According to the invention to solve the problem, there is provided a high-pressure fuel pump which includes a pump body which is formed with a pressing chamber and a cylinder which is inserted in a hole formed in the pump body. The cylinder is swaged to the hole by pressing a convex portion on an outside in a radial direction to fit into the hole on an opposite side to the pressing chamber, by screwing a formed screw thread into the hole, or by being swaged with the opposite side to the pressing chamber. The cylinder is formed with a clearance in the radial direction with respect to the hole of the pump body all over a region from a bonding portion to an upper end.

Advantageous Effects of Invention

According to the invention, it is possible to provide a high-pressure fuel pump which can fix a cylinder to a pump body using a simple structure, and can reduce a displacement amount inward in a radial direction of the cylinder.

Objects, configurations, and effects besides the above description will be apparent through the explanation on the following embodiments.

DESCRIPTION OF EMBODIMENTS

Hereinafter, the configurations and operational effects of a fuel feed pump according to first and second embodiments of the invention will be described using the drawings. The fuel feed pump of this embodiment is a high-pressure fuel pump which discharges fuel of a high pressure of 20 MPa or more. Further, the same symbol in the drawings represents the same portion.

First Embodiment (Entire Configuration)

Figure 5:
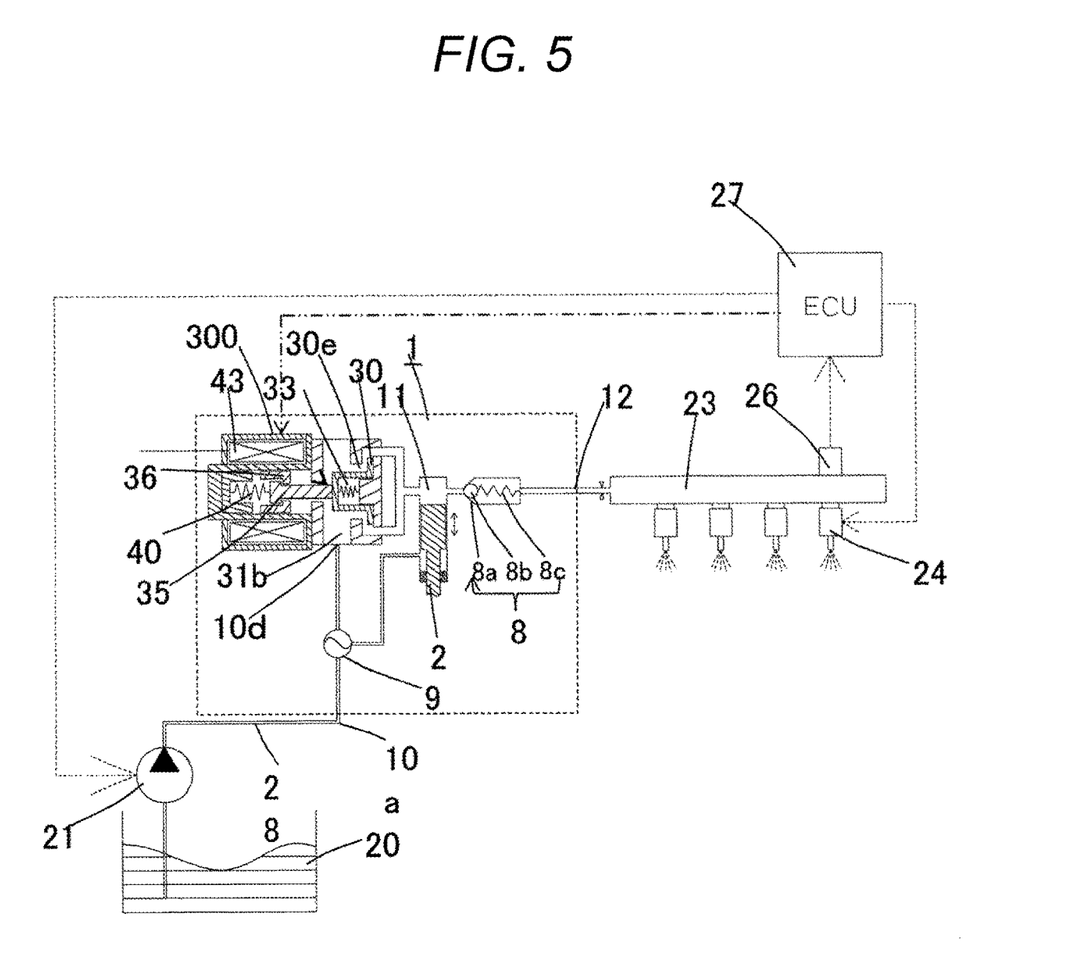
FIG. 5 is a diagram illustrating the entire configuration of a system including the high-pressure fuel pump according to the invention.

First, the configuration and the operation of a system will be described using a diagram illustrating the entire configuration of an engine system illustrated in FIG. 5. A portion surrounded by a broken line indicates a main body of the fuel feed pump, and the mechanisms/components illustrated in the broken line are integrally assembled in a pump body 1.

The fuel of a fuel tank 20 is pumped up by a feed pump 21 on the basis of a signal from an engine control unit 27 (hereinbelow, referred to as ECU). The fuel is pressured to an appropriate feed pressure to pass through a suction pipe 28, and sent to a low-pressure fuel suction port 10a of the fuel feed pump.

The fuel passing from the low-pressure fuel suction port 10a through a suction joint 51 (see FIG. 2) reaches a suction port 31b of an electromagnetic suction valve mechanism 300 of a capacity variation mechanism through a metal damper 9 (pressure pulsation damping mechanism) and a suction passage 10d.

The fuel flowing to the electromagnetic suction valve mechanism 300 passes through a suction valve 30 and flows into a pressing chamber 11. A plunger 2 is applied with power of a reciprocating motion by a cam 93 (see FIG. 1) of an engine (internal combustion engine). In a downward stroke of the plunger 2, the fuel is sucked from the suction valve 30 by the reciprocating motion of the plunger 2. The fuel is pressured in an upward stroke. The fuel is pumped to a common rail 23 equipped with a pressure sensor 26 through a discharge valve mechanism 8. Then, an injector 24 injects the fuel to the engine on the basis of a signal from the ECU 27. This embodiment relates to a fuel feed pump which is applied to a system in which the injector 24 directly injects the fuel into the cylinder of the engine (so-called direct injection engine system).

The fuel feed pump ejects a desired rate of supply fuel according to the signal from the ECU 27 to the electromagnetic suction valve mechanism 300.

(Configuration of Fuel Feed Pump)

Figure 1:
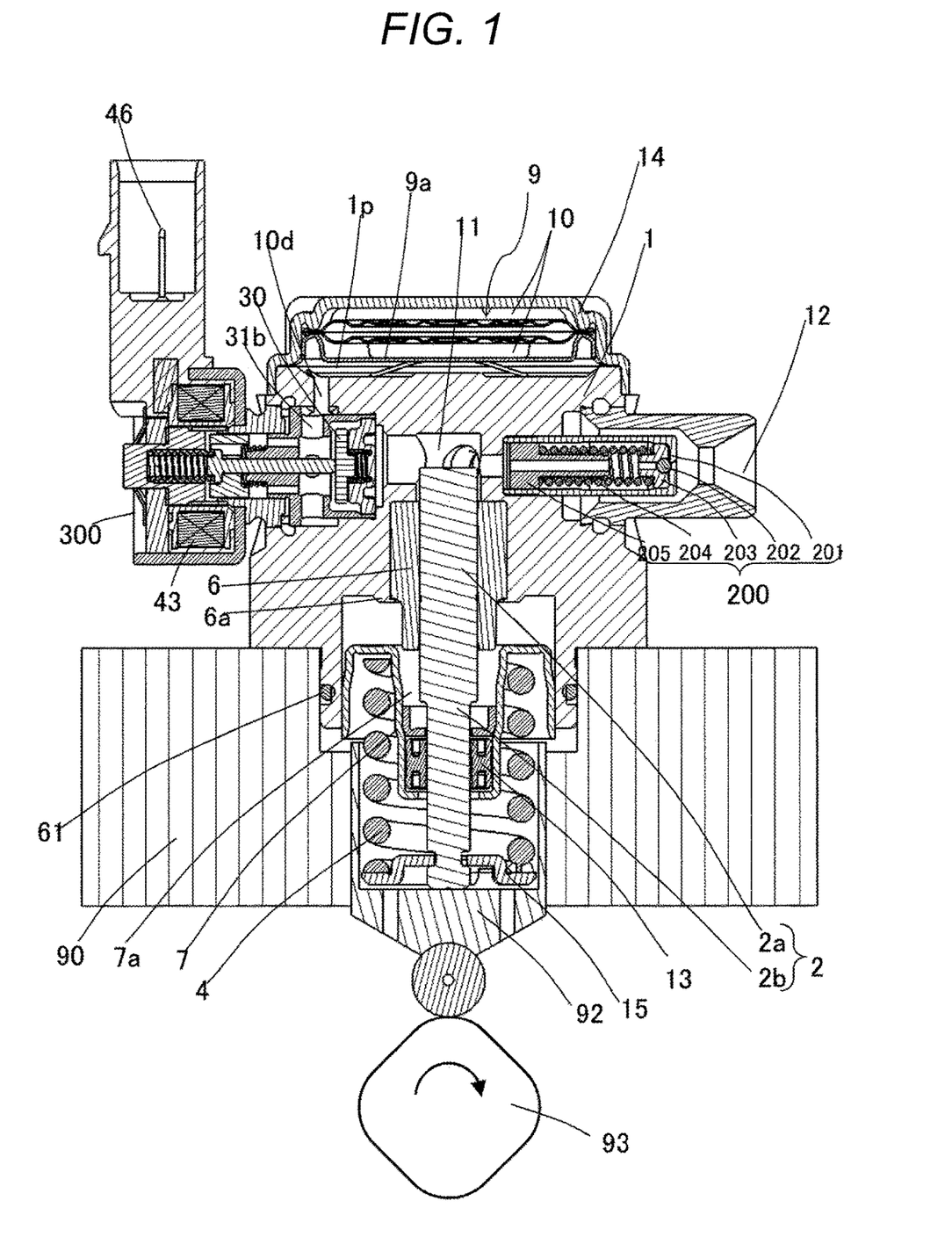
FIG. 1 is an entire cross-sectional view of a plunger taken along an axial direction in a high-pressure fuel pump of a first embodiment according to the invention.
Figure 2:
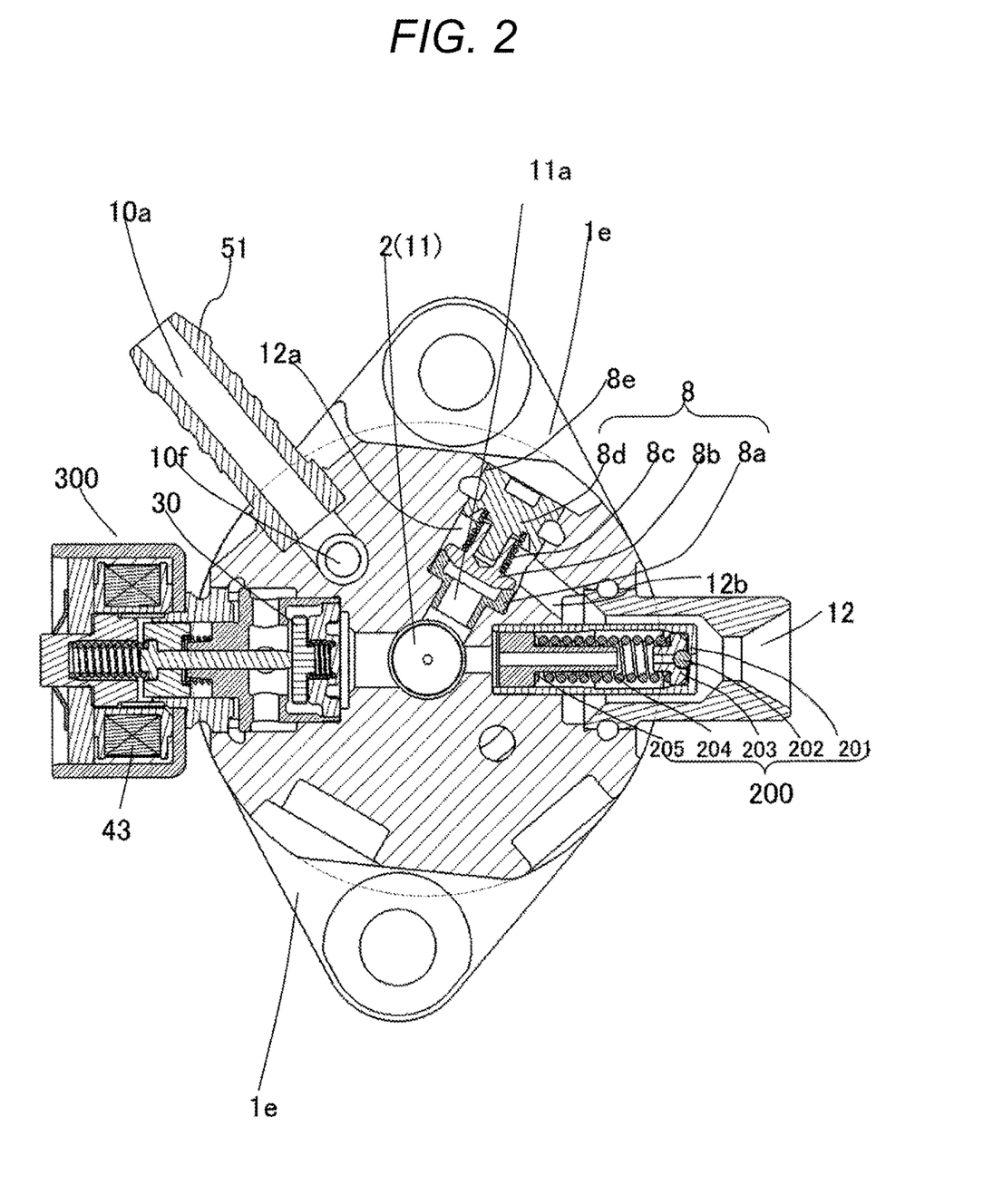
FIG. 2 is an entire cross-sectional view of the plunger taken along a direction perpendicular to the axial direction thereof in the high-pressure fuel pump of the first embodiment according to the invention, illustrated at the axial center of a suction port and the axial center of a discharge port of fuel.
Figure 3:
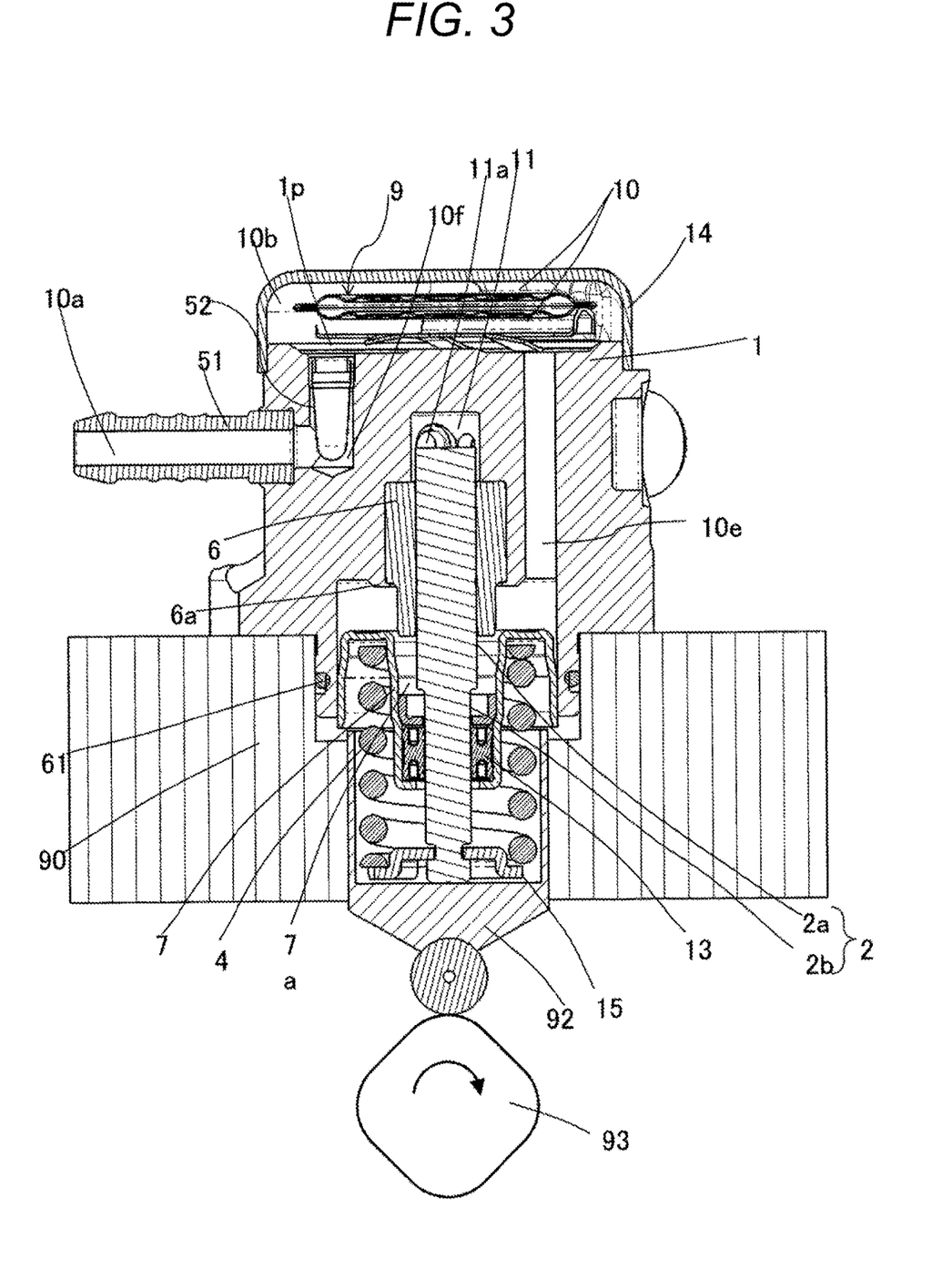
FIG. 3 is an entire cross-sectional view when viewed at an angle different from FIG. 1 of the high-pressure fuel pump of the first embodiment according to the invention, illustrated at the axial center of a suction joint.
Figure 4:
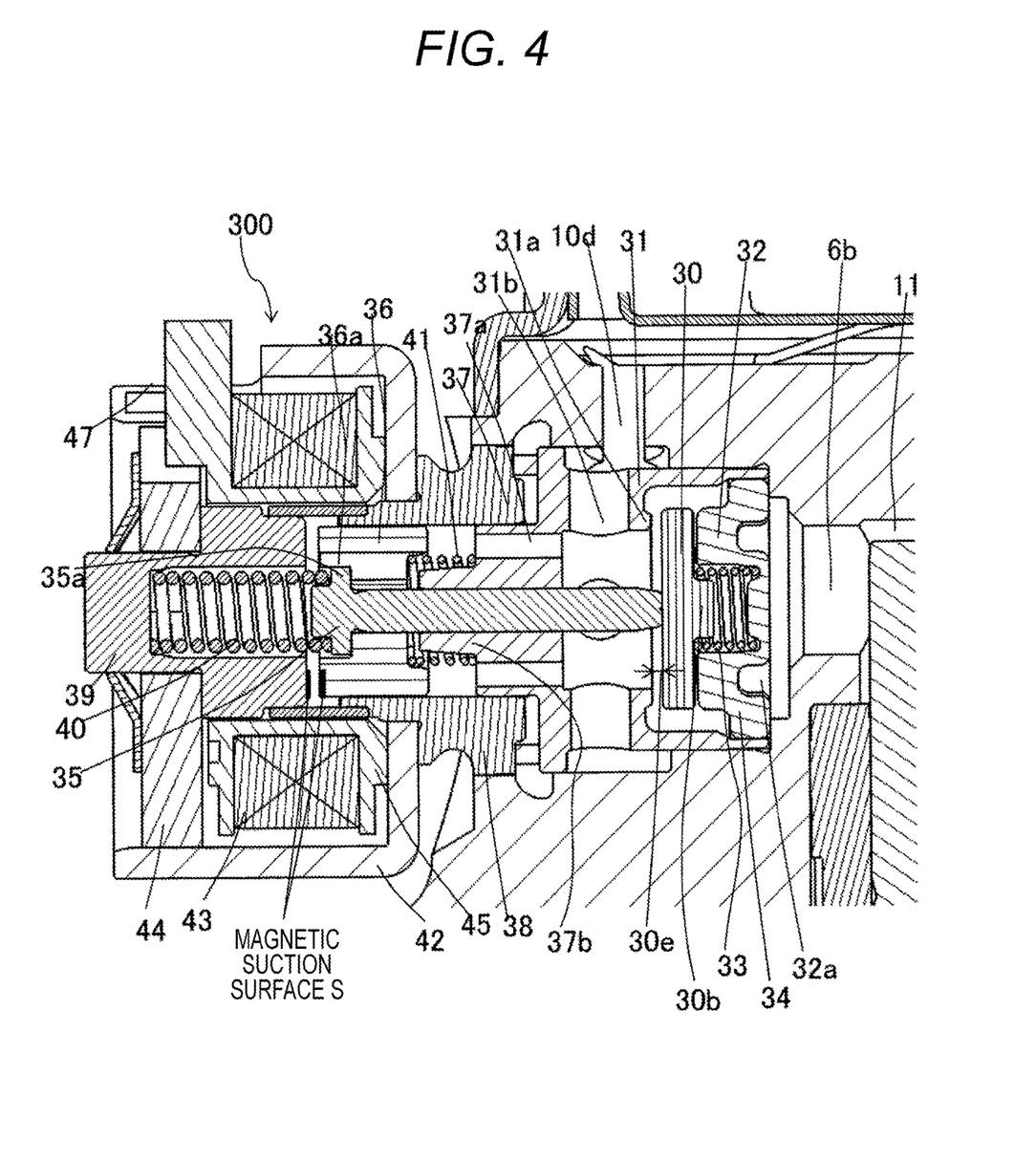
FIG. 4 is an enlarged view of a vertical cross-sectional view of an electromagnetic suction valve mechanism of the high-pressure fuel pump of the first embodiment according to the invention.

Next, the configuration of the fuel feed pump will be described using FIGS. 1 to 4. FIG. 1 illustrates a vertical cross-sectional view of the fuel feed pump, and FIG. 2 is a horizontal cross-sectional view of the fuel feed pump when viewed from above. In addition, FIG. 3 is a vertical cross-sectional view of the fuel feed pump in a direction different from that of FIG. 1. FIG. 4 is an enlarged view of the electromagnetic suction valve mechanism 300.

As illustrated in FIG. 1, the fuel feed pump includes the metal damper 9, the pump body 1 (pump body) where a damper storage portion 1p is formed to store the metal damper 9, a damper cover 14 which is attached to the pump body 1, covers the damper storage portion 1p and holds the metal damper 9 with respect to the pump body 1, and a holding member 9a which is fixed to the damper cover 14 and holds the metal damper 9 from the opposite side of the damper cover 14. The holding member 9a is disposed between the metal damper 9 and the pump body 1, and holds the metal damper 9 from the pump body 1 side.

The fuel feed pump comes into tight contact with a fuel feed pump mounting portion 90 of the internal combustion engine using a mounting flange 1e (see FIG. 2) provided in the pump body 1, and fixed by a plurality of bolts.

As illustrated in FIG. 1, an O ring 61 is fitted to the pump body 1 for sealing between the fuel feed pump mounting portion 90 and the pump body 1, and prevents engine oil from leaking outside.

In the pump body 1, a cylinder 6 is mounted to guide the reciprocating motion of the plunger 2 and to form the pressing chamber 11 together with the pump body 1. In addition, there are provided the electromagnetic suction valve mechanism 300 to supply the fuel to the pressing chamber 11, and the discharge valve mechanism 8 (see FIG. 2) to discharge the fuel to a discharge passage from the pressing chamber 11.

The cylinder 6 is press-fitted into the pump body 1 on the outer peripheral side as illustrated in FIG. 1, and deforms the body toward the inner peripheral side in a fixing portion 6a to press the cylinder 6 to the upper direction in the drawing, so that the fuel pressured by the pressing chamber 11 in the upper end surface of the cylinder 6 is sealed not to be leaked out toward the lower pressure side.

In the lower end of the plunger 2, there is provided a tappet 92 which converts a rotation motion of the cam 93 (cam mechanism) mounted in a cam shaft of the internal combustion engine into an up-down motion, and transmits the up-down motion to the plunger 2. The plunger 2 is tightly pressed to the tappet 92 by a spring 4 through a retainer 15. With this configuration, the plunger 2 can make a reciprocating motion in the vertical direction according to the rotation motion of the cam 93.

In addition, a plunger seal 13 held in the lower end portion of the inner periphery of a seal holder 7 is placed to come into slidable contact with the outer periphery of the plunger 2 in the lower portion in the drawing of the cylinder 6. With this configuration, when the plunger 2 slides, the fuel in an auxiliary chamber 7a is sealed, and prevented not to flow into the internal combustion engine. At the same time, it is prevented that lubricating oil (also including the engine oil) for lubricating the sliding portion in the internal combustion engine flows into the pump body 1.

The suction joint 51 is mounted in the side surface portion of the pump body 1 of the fuel feed pump. The suction joint 51 is connected to a low-pressure pipe through which the fuel from the fuel tank 20 of a vehicle is supplied, and the fuel is supplied from the low-pressure pipe into the fuel feed pump. A suction filter 52 (see FIG. 3) in the suction joint 51 plays a role of preventing that a foreign matter existing between the fuel tank 20 and the low-pressure fuel suction port 10a flows into the fuel so as to be sucked into the fuel feed pump.

The fuel passed through the low-pressure fuel suction port 10a reaches the suction port 31b of the electromagnetic suction valve mechanism 300 through the metal damper 9 and the suction passage 10d (low-pressure fuel flow path) as illustrated in FIG. 1. The electromagnetic suction valve mechanism 300 will be described in detail on the basis of FIG. 4. A coil portion is configured by a first yoke 42, an electromagnetic coil 43, a second yoke 44, a bobbin 45, a terminal 46, and a connector 47. The coil 43 bound on the bobbin 45 several times with a copper line is disposed to fall between the first yoke 42 and the second yoke 44, integrally molded and fixed with a resin connector. One end of each of two terminals 46 is electrically connected to each of both ends of the copper line of the coil. The terminal 46 is similarly integrally molded with the connector, and the other end is configured to be connected to an engine control unit side.

The coil portion is configured such that a hole of the center portion of the first yoke 42 is press-fitted into and fixed to an outer core 38. At this time, the inner peripheral side of the second yoke 44 is configured to come into contact with or to make a slight clearance from a fixed core 39.

The first yoke 42 and the second yoke 44 are made of a magnetic stainless material to form a magnetic circuit and also in consideration of corrosion resistance. The bobbin 45 and the connector 47 are made of a high strength and high thermal resistance resin in consideration of a strength property and a thermal resistance. The coil 43 is made of copper, and a material made of metal-plated brass is used for the terminal 46.

In this way, if the magnetic circuit is formed of the outer core 38, the first yoke 42, the second yoke 44, the fixed core 39, and an anchor portion 36, and the current flows to the coil, a magnetic attraction force is generated between the fixed core 39 and the anchor portion 36, and a force pulling each other is generated. A portion in an axial direction where the fixed core 39 and the anchor portion 36 generate the magnetic attraction force to each other in the outer core 38 is made extremely thin so as to make almost all the magnetic flux pass through between the fixed core 39 and the anchor portion 36. Therefore, it is possible to obtain the magnetic attraction force with efficiency. A solenoid mechanism is configured by a rod 35 (moving portion), the anchor portion 36, a rod guide 37 (fixing portion), the outer core 38, the fixed core 39, a rod biasing spring 40, and an anchor portion biasing spring 41.

The rod 35 (moving portion) and the anchor portion 36 are configured by different members. The rod 35 is slidably held in the axial direction on the inner peripheral side of the rod guide 37. The inner peripheral side of the anchor portion 36 is slidably held on the outer peripheral side of the rod 35. In other words, the rod 35 and the anchor portion 36 are configured to be slidable in the axial direction within a geographically restricted range.

The anchor portion 36 includes one or more through holes 36a passing through a product in the axial direction in order to freely and smoothly move in the axial direction in the fuel, and extremely excludes the restriction of movement caused by a pressure difference before and after the anchor portion.

The rod guide 37 is configured such that the suction valve of a fuel feed pump body 1 is inserted on the inner peripheral side of the hole for insertion in a radial direction, and abuts on one end of a suction valve seat in the axial direction, and is interposed between the fuel feed pump body 1 and the outer core 38 fixedly welded to the fuel feed pump body 1. Similarly to the anchor portion 36, a through hole 37a passing through in the axial direction is provided even in the rod guide 37 so as to make the anchor portion freely and smoothly move and not to allow the pressure of the fuel chamber on the anchor portion side to hinder the movement of the anchor portion.

The outer core 38 is formed such that the shape on the opposite side to the portion weld with the fuel feed pump body becomes a thin cylindrical shape, and is fixedly welded with the fixed core 39 inserted on the inner peripheral side. The rod biasing spring 40 is disposed on the inner peripheral side of the fixed core 39 while guided by a small diameter portion, the rod 35 comes into contact with the suction valve 30, and the suction valve is applied with a biasing force in a direction pulling out of a suction valve seat 31a (that is, a direction of opening the suction valve).

The anchor portion biasing spring 41 is disposed to apply a biasing force to the anchor portion 36 in a direction of the rod flange 35a while inserting one end to a cylindrical central bearing 37b provided on the center side of the rod guide 37 and keeping the coaxial. A moving amount 36e of the anchor portion 36 is set to be larger than a moving amount 30e of the suction valve 30. This setting is made to securely close the suction valve 30.

Since the rod 35 and the rod guide 37 slide to each other, and the rod 35 repeatedly comes into conflict with the suction valve 30, a martensitic stainless steel subjected to thermal treatment is used in consideration of rigidity and corrosion resistance. The anchor portion 36 and the fixed core 39 are made using magnetic stainless steel to form the magnetic circuit. The rod biasing spring 40 and the anchor portion biasing spring 41 are made using austenitic stainless steel in consideration of corrosion resistance.

According to the above configuration, three springs are organically disposed in the suction valve and the solenoid mechanism. A suction valve biasing spring 33 configured in the suction valve and the rod biasing spring 40 configured in the solenoid mechanism, and the anchor portion biasing spring 41 correspond to the above configuration. In this embodiment, all the springs are configured using the coil springs, but any configuration may be employed as long as a biasing force can be obtained.

The discharge valve mechanism 8 provided in the outlet of the pressing chamber 11 is configured by a discharge valve seat 8a, a discharge valve 8b which comes into contact with or separates from the discharge valve seat 8a, a discharge valve spring 8c which biases the discharge valve 8b toward the discharge valve seat 8a, and a discharge valve stopper 8d which determines a stroke (moving distance) of the discharge valve 8b as illustrated in FIG. 2. The discharge valve stopper 8d and the pump body 1 are bonded by welding at an abutting portion 8e to block the fuel from the outside.

In a state where there is no difference in fuel pressure between the pressing chamber 11 and a discharge valve chamber 12a, the discharge valve 8b is tightly pressed to the discharge valve seat 8a by the biasing force of the discharge valve spring 8c, and enters a closed state. When the fuel pressure of the pressing chamber 11 becomes larger than that of the discharge valve chamber 12a, first the discharge valve 8b is opened against the discharge valve spring 8c. Then, a high-pressure fuel in the pressing chamber 11 is discharged to the common rail 23 through the discharge valve chamber 12a, a fuel discharge passage 12b, and a fuel discharge port 12.

When being opened, the discharge valve 8b comes into contact with the discharge valve stopper 8d, and the stroke is restricted. Therefore, the stroke of the discharge valve 8b is appropriately determined by the discharge valve stopper 8d. With this configuration, it is possible to prevent that the stroke becomes so large to delay the close of the discharge valve 8b and thus the fuel discharged at a high pressure to the discharge valve chamber 12a flows back into the pressing chamber 11. Therefore, deterioration in efficiency of the fuel feed pump can be suppressed. In addition, when the discharge valve 8b repeatedly opens and closes, the discharge valve 8b is guided by the outer peripheral surface of the discharge valve stopper 8d so as to move only in the stroke direction. With the configuration described above, the discharge valve mechanism 8 serves as a check valve to restrict the flowing direction of the fuel.

Further, the pressing chamber 11 is configured by the pump body 1 (pump housing), the electromagnetic suction valve mechanism 300, the plunger 2, the cylinder 6, and the discharge valve mechanism 8.

(Operation of Fuel Feed Pump)

When the plunger 2 moves in the direction of the cam 93 and enters a suction stroke state while the cam 93 rotates, the volume of the pressing chamber 11 is increased and the fuel pressure in the pressing chamber 11 is lowered. If the fuel pressure in the pressing chamber 11 is lowered than the pressure of the suction port 31b in this stroke, the suction valve 30 enters an open state. As illustrated in FIG. 4, the fuel passes through an opening 30e of the suction valve 30, and flows to the pressing chamber 11.

After the plunger 2 ends the suction stroke, the plunger 2 turns to the upward movement and moves to a compression stroke. Herein, the electromagnetic coil 43 keeps a non-energization state, and a magnetic biasing force does not operate. The rod biasing spring 40 is set to cause a biasing force sufficient and required for keeping the opened suction valve 30 in the non-energization state. The volume of the pressing chamber 11 is reduced according to the compression movement of the plunger 2. However, in this state, the fuel once sucked into the pressing chamber 11 returns to the suction passage 10d through the opening 30e of the suction valve 30 which enters the open state again. Therefore, the pressure of the pressing chamber is not increased. This stroke is called a returning stroke.

In this state, if a control signal from the ECU 27 is applied to the electromagnetic suction valve mechanism 300, the current flows to the electromagnetic coil 43 through the terminal 46. Then, the magnetic attraction force operates between the magnetic core 39 and the anchor, so that the magnetic biasing force overcomes the biasing force of the rod biasing spring 40 to make the rod 35 move in a direction away from the suction valve 30. Therefore, the suction valve 30 is closed by the biasing force of the suction valve biasing spring 33 and a fluid force caused by the flowing of the fuel into the suction passage 10d. After the valve is closed, the fuel compression of the pressing chamber 11 increases together with the upward movement of the plunger 2. If the fuel compression becomes equal to or more than the fuel discharge port 12, the high-pressure fuel is discharged through the discharge valve mechanism 8, and is supplied to the common rail 23. This stroke is called a discharge stroke.

In other words, the compression stroke of the plunger 2 (the upward stroke from the lower start point to the upper start point) includes the returning stroke and the discharge stroke. Then, the amount of the discharging high-pressure fuel can be controlled by controlling timing for energizing the electromagnetic coil 43 of the electromagnetic suction valve mechanism 300. If the timing for energizing the electromagnetic coil 43 is set to be advanced, the ratio of the returning stroke in the compression stroke becomes small, and the ratio of the discharge stroke becomes large. In other words, the fuel returning to the suction passage 10d becomes less, and the discharged high-pressure fuel becomes large. On the other hand, if the energizing timing is set to be delayed, the ratio of the returning stroke in the compression stroke becomes large, and the ratio of the discharge stroke becomes small. In other words, the fuel returning to the suction passage 10d becomes large, and the discharged high-pressure fuel becomes less. The timing for energizing the electromagnetic coil 43 is controlled by a command from the ECU 27. As described above, it is possible to control the amount of high-pressure fuel to be discharged as much as the internal combustion engine requires by controlling the timing for energizing the electromagnetic coil 43.

(Configuration of Metal Damper)

As illustrated in FIG. 1, the metal damper 9 is provided in a low-pressure fuel chamber 10 to lower that a pressure pulsation generated in the fuel feed pump spreads to the suction pipe 28 (fuel pipe). In a case where the fuel flown into the pressing chamber 11 returns to the suction passage 10d through the suction valve 30 (the suction valve body) which enters the open state again to control the volume, the pressure pulsation is generated in the low-pressure fuel chamber 10 by the fuel returned to the suction passage 10d. However, the metal damper 9 provided in the low-pressure fuel chamber 10 is formed by metal diaphragm damper formed by bonding two disk-like metal plates of a corrugate shape at the outer periphery and with an inert gas such as argon injected therein, so that the pressure pulsation is absorbed and reduced as the metal damper expands and contracts.

The plunger 2 includes a large diameter portion 2a and a small diameter portion 2b. The volume of the auxiliary chamber 7a is increased or decreased according to the reciprocating motion of the plunger 2. The auxiliary chamber 7a is connected to the low-pressure fuel chamber 10 by a fuel passage 10e (see FIG. 3). The fuel flows from the auxiliary chamber 7a to the low-pressure fuel chamber 10 when the plunger 2 descends. The fuel flows from the low-pressure fuel chamber 10 to the auxiliary chamber 7a when the plunger 2 ascends.

With this configuration, the fuel flow amount to the inside and outside of the pump in the suction stroke or the returning stroke of the pump can be reduced, and the pressure pulsation generated in the fuel feed pump is reduced.

Figure 6:
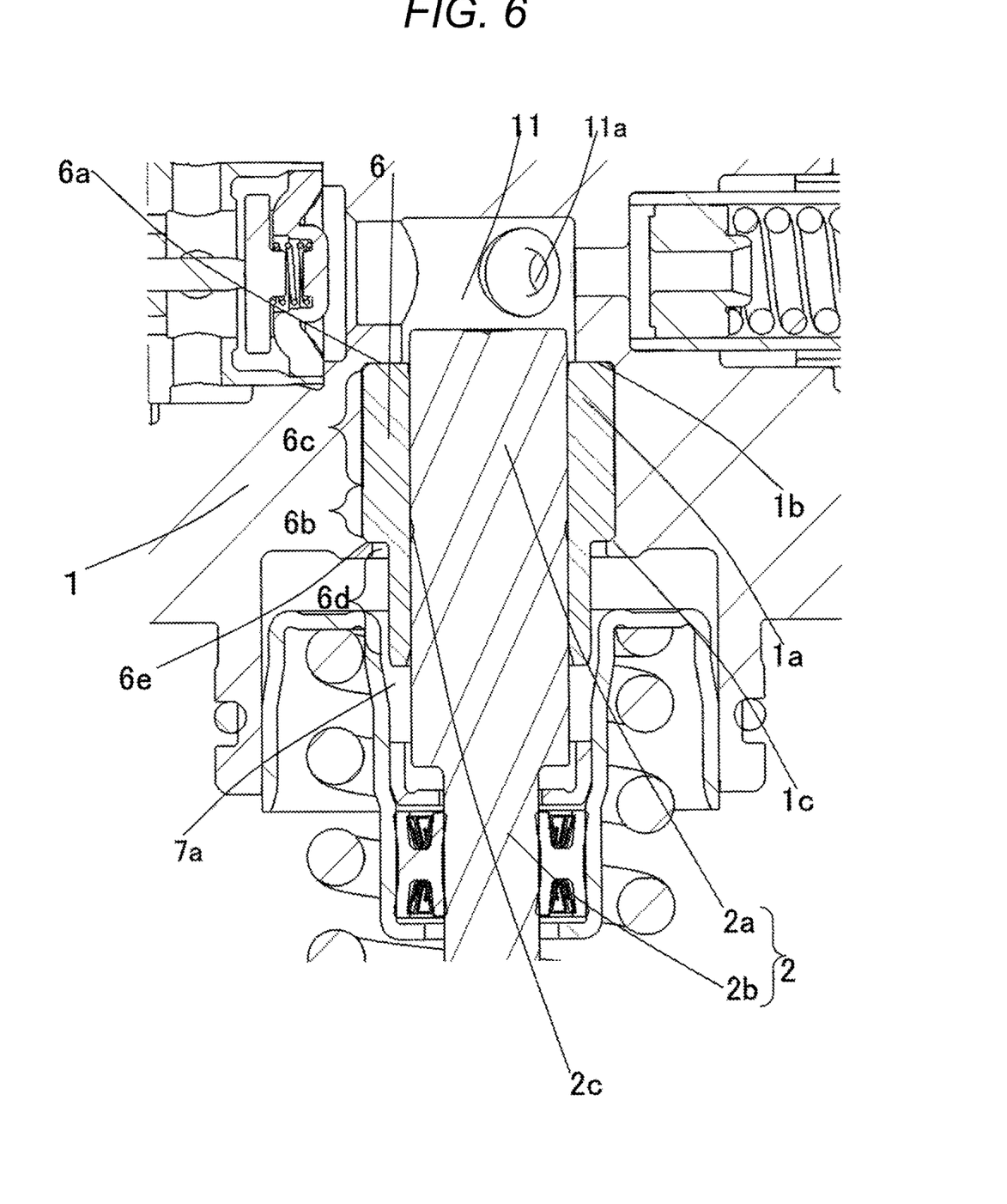
FIG. 6 is a cross-sectional view illustrating the vicinity of a cylinder taken along the axial direction of the plunger in the high-pressure fuel pump of the first embodiment according to the invention.
Figure 7:
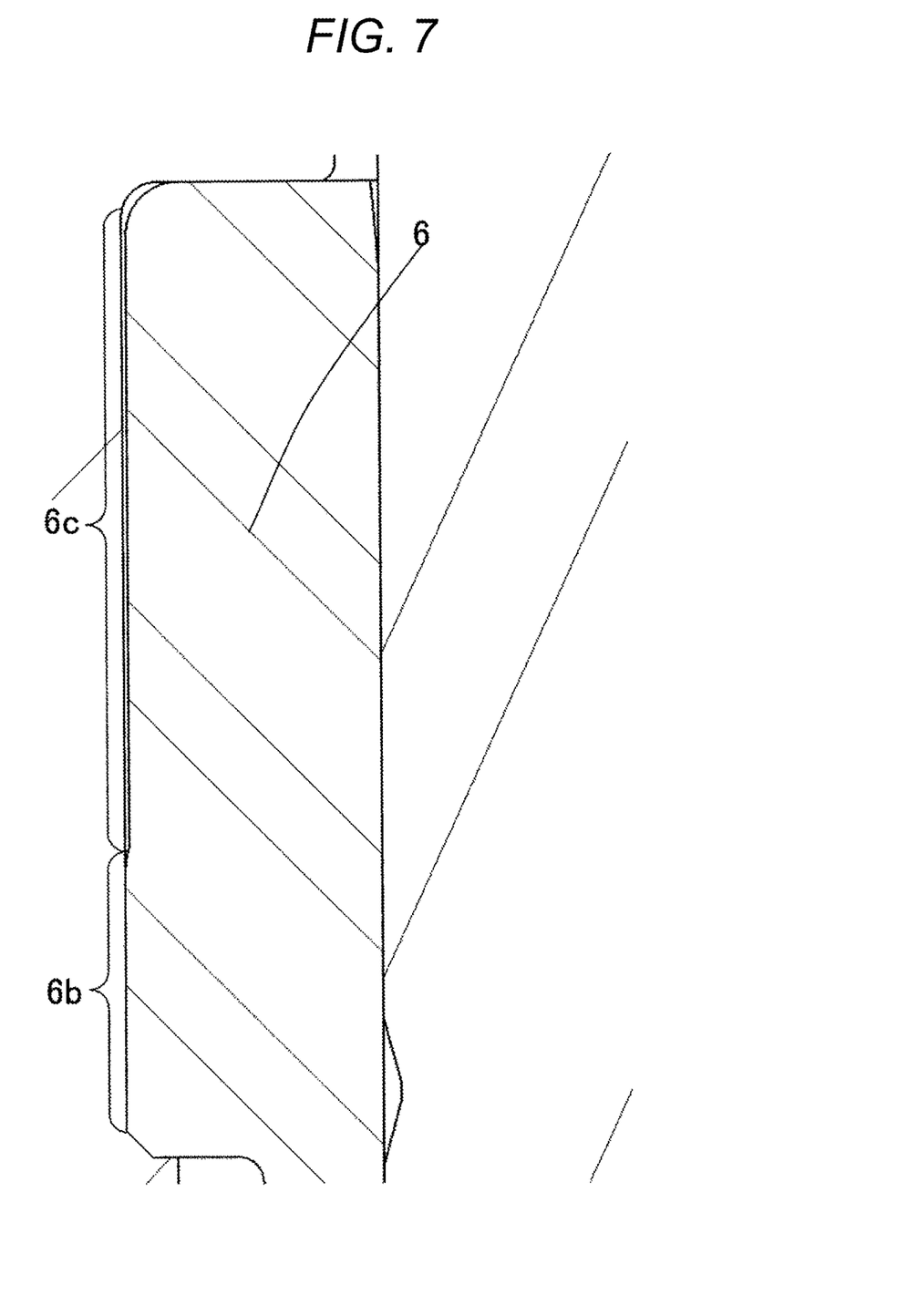
FIG. 7 is a vertically cross-sectional view in which the cylinder in FIG. 6 is enlarged.

Hereinafter, a cylinder structure of this embodiment will be described in detail using FIGS. 6 and 7. FIG. 6 is a cross-sectional view illustrating the plunger 2 taken along the axial direction in the fuel feed pump of this embodiment.

The fuel feed pump is formed by forming a hole 1a from a downward direction in a member of the pump body 1 by the pressing chamber 11. A contact end surface 6a of the cylinder 6 comes into contact with an upper end 1b of the pump body 1 forming the hole 1a. Even in a state where the plunger 2 is at the bottom dead center position, the tip portion of the plunger 2 is configured to protrude toward the pressing chamber 11 (the upper side of FIG. 6) from the contact end surface 6a of the cylinder 6. The contact surface (tightly pressed portion) between the cylinder 6 and the pump body 1 and a clearance configuration will be described.

As a fixing portion with respect to the pump body 1 of the cylinder 6, there is a press-fitting portion 6b which is a convex portion of the cylinder 6. Then, the pump body 1 and the press-fitting portion 6b are press-fitted into each other so as to be fixed. With this configuration, the fixing can be made by simple work. Further, a method of fixing the cylinder 6 and the pump body 1 may be fixed by a screw instead of the press-fitting portion 6b. In addition, a clearance 6c spacing from the pump body 1 is formed in a region near the pressing chamber side from the press-fitting portion 6b.

As described above, the high-pressure fuel pump of this embodiment includes the pump body 1 where the pressing chamber 11 is formed and the cylinder 6 where the hole 1a formed in the pump body 1 is inserted. The cylinder 6 is configured such that the convex portion 6b on the outside in the radial direction is press-fitted into the hole 1a on the opposite side to the pressing chamber 11. Further, the hole 1a of the pump body 1 may be swaged by bonding the cylinder 6 and the hole 1a of the pump body 1 by screwing a screw thread formed in any one, or by swaging the opposite side of the pressing chamber 11 of the cylinder 6.

Then, the cylinder 6 is formed with a clearance in the radial direction with respect to the hole 1a of the pump body 1 over the entire region 6c from a bonding portion (the convex portion 6b) to the upper end.

The effects of this configuration will be described below. The fuel is increased to a high pressure by the pressing chamber 11, and accordingly the fuel temperature is similarly increased. The cylinder 6 is thermally expanded according to the increase of the fuel temperature. Specifically, a discharge of the high-pressure fuel such as 35 MPa or more is requested in recent years. Therefore, an increased amount of the fuel temperature becomes large. At this time, if the upper portion of the cylinder 6 is configured to come into contact with the hole 1a of the pump body 1, the upper portion of the cylinder 6 is deformed due to the thermal expansion, the outer peripheral surface of the cylinder 6 comes into contact with the pump body 1 and the inner peripheral surface of the cylinder 6 comes into contact with the plunger 2. Then, the inventors have found out that, if the deformation amount is large, the outer peripheral surface of the cylinder 6 pushes the pump body 1, the inner peripheral surface of the cylinder 6 pushes the plunger 2, and as a result, the plunger 2 does not slide (so-called sticking phenomenon).

In this embodiment, by adopting the above-described configuration, even if the upper portion of the cylinder 6 is deformed due to the thermal expansion, it is possible to suppress that the outer peripheral surface of the cylinder 6 pushes the pump body 1 as much as the clearance 6c. Therefore, since the pushing of the inner peripheral surface of the cylinder 6 toward the plunger 2 can be suppressed, it is possible to avoid the sticking phenomenon of the plunger 2 which may occur as the fuel feed pump is increased in pressure.

In addition, a gap between the cylinder 6 and the plunger 2 influences on the flow amount of the high-pressure fuel pump. Therefore, it is possible to cope with a high flow rate by reducing the gap. In addition, as a fixing method of the cylinder 6, the outer diameter portion (outer peripheral portion) 6b of the cylinder 6 is press-fitted into the pump body 1, and an end surface 6e on the opposite side of the pressing chamber of the cylinder 6 is combined to the pump body 1 by plastic deformation of a swaged portion 1c of the pump body 1. In this case, the cylinder 6 is tightly pressed to the contact surface (the swaged portion 1c) of the pump body 1, and the pressing force is set to be added toward the upper side in the axial direction so as to fix the cylinder 6 to the pump body 1. In other words, the swaged portion 1c inward in the radial direction is formed at the lower end of the hole 1a of the pump body 1, and the upper surface of the swaged portion 1c comes into contact with the lower surface (the end surface 6e) of the large diameter portion of the cylinder 6, so that the movement to the lower direction of the cylinder 6 is restricted.

With the structure of combining the cylinder 6 to the pump body 1 using the swaged portion 1c of the pump body 1, the number of components is reduced, and the cylinder 6 can be assembled to the pump body 1 by simple machining (work). As a structure for tightly pressing a step surface 6e of the cylinder 6 to the pump body 1, a configuration other than the swaged portion 1c may be employed.

A pressure difference between the suction passage 10b and the pressing chamber 11 is secured by the surface pressure in the axial direction operating on the cylinder 6. Specifically, the pressure of the suction passage 10b is a fuel pressure on the low pressure side which is supplied by the feed pump 21, and about 0.4 MPa. On the other hand, the pressure generated in the pressing chamber 11 is a fuel pressure on the high pressure side which is pressured by the fuel feed pump, and an instantaneous pressure is about 30 to 50 MPa.

The pressured fuel is supplied to the common rail 23 through a communication hole 11a which is bored in the side surface of the pump body 1 from the pressing chamber 11, the discharge valve mechanism 8, and the fuel discharge port 12. At the time of the upward stroke of the plunger 2 (when the plunger is displaced in the upward direction in FIG. 6), the fuel is pressured by the pressing chamber 11, and the pressure operates on the contact end surface 6a between the cylinder 6 and the pump body 1. The pressure at this time operates in a direction where the cylinder 6 is separated from the pump body 1 (the lower direction of FIG. 6). The pressure of the contact surface pressured by the swaged portion 1c is designed such that the pressure fuel of the pressing chamber 11 is not leaked to a space (the auxiliary chamber 7a) formed in the lower end portion of the seal holder 7 and the cylinder 6, and the cylinder 6 is not separated.

A plunger groove (a concave portion 2c) dented inward in the radial direction is formed in the plunger 2. The plunger groove (the concave portion 2c) is formed in an annular shape in the outer peripheral portion of the plunger 2. Hereinbelow, a positional relation between the plunger groove (the concave portion 2c) and the cylinder 6 will be described. Before the plunger 2 starts the upward stroke, that is, the plunger 2 is on the bottom dead center side separated farthest from the pressing chamber 11, the plunger groove (the concave portion 2c) exists in the inside of the radial direction of the press-fitting portion 6b of the cylinder 6. In other words, the plunger groove (the concave portion 2c) is formed at a position corresponding in the axial direction to the convex portion 6b of the cylinder 6 to be dented inward in the radial direction in a state where the plunger 2 is positioned separated farthest from the pressing chamber 11.

With the plunger groove (the concave portion 2c), the plunger 2 and the cylinder 6 are effectively lubricated. In addition, the plunger groove (the concave portion 2c) is desirably formed all over the outer diameter portion of the plunger 2.

The inner side surface in the radial direction of the press-fitting portion 6b (the convex portion of the cylinder 6) and the inner side surface in the radial direction of the clearance 6c both serve as a guide portion on which the outer peripheral portion of the plunger 2 slides. Further, the plunger of this embodiment includes a guide portion 6d on the lower side in the axial direction of the press-fitting portion 6b (the convex portion). The thickness in the radial direction of the guide portion 6d is configured to be small compared to the thickness in the radial direction of the press-fitting portion 6b. In addition to the inner side surface in the radial direction of the press-fitting portion 6b and the inner side surface in the radial direction of the clearance 6c, the guide portion 6d is provided, so that the inclination of the plunger 2 can be suppressed. Therefore, it is possible to suppress the cylinder 6 from being stuck. A side force added to the plunger seal 13 and the seal holder 7 where the plunger seal 13 is assembled can be reduced.

Further, in this embodiment, the plunger groove 2c of the plunger 2 and the guide portion 6d of the cylinder 6 are not essential components, and the effects of the invention can be achieved even if these components are not provided. Further, after studying intensively, the inventors have found out that the clearance (the clearance 6c) is desirably formed to be 0.025 mm or more. In addition, the cylinder 6 includes the large diameter portion (the clearance 6c) having an even thickness in the radial direction, and the convex portion (the press-fitting portion 6b) is desirably formed to protrude outside in the radial direction by 0.0165 mm or more from the outermost diameter portion of the large diameter portion (the clearance 6c) in the lower portion of the large diameter portion (the clearance 6c).

In addition, the cylinder 6 includes the large diameter portion (the clearance 6c) having an even thickness in the radial direction, and is desirably formed such that the length in the axial direction of the convex portion (the press-fitting portion 6b) becomes 0.34 to 0.41 times that of the large diameter portion (the clearance 6c). The cylinder 6 includes the large diameter portion (the clearance 6c) having an even thickness in the radial direction and the small diameter portion (the guide portion 6d) having a smaller thickness in the radial direction than that of the large diameter portion (the clearance 6c), and is desirably formed such that the length in the axial direction of the small diameter portion (the guide portion 6d) becomes 0.94 to 1.01 times that in the axial direction of the large diameter portion (the clearance 6c). The cylinder 6 includes the large diameter portion (the clearance 6c) having an even thickness in the radial direction and the small diameter portion (the guide portion 6d) having a smaller thickness in the radial direction than that of the large diameter portion (the clearance 6c), and is desirably formed such that the thickness in the radial direction of the small diameter portion (the guide portion 6d) becomes 0.34 to 0.40 times that in the radial direction of the large diameter portion (the clearance 6c). Further, as illustrated in FIGS. 6 and 7, the convex portion (the press-fitting portion 6b) is desirably disposed on the lower side from the center position in a region in the axial direction where the cylinder 6 faces the hole 1a of the pump body 1. With the above configuration, it is possible to prevent the plunger 2 from being stuck.

The structure that the cylinder 6 and the plunger 2 are not stuck by increasing the temperature of the fuel as the pressure is increased to 35 MPa or more is a very important element to provide the high-pressure fuel pump which achieves a high reliability and a large fluid rate. In this embodiment, the clearance 6c of the cylinder 6 is provided as described above, so that the deformation toward the inner diameter side of the cylinder 6 is suppressed, and the sticking to the plunger 2 is prevented. As a result, the gap between the cylinder 6 and the plunger 2 can be made narrow, so that the increasing of the pressure of the high-pressure fuel pump and the large fluid rate can be achieved.

Further, the invention is not limited to the above embodiments, but various modifications may be contained. For example, the above-described embodiments of the invention have been described in detail in a clearly understandable way, and are not necessarily limited to those having all the configurations. In addition, some of the configurations of the embodiments may be omitted, replaced with other configurations, and added to other configurations.

REFERENCE SIGNS LIST 1 pump body
2 plunger
2c plunger groove
6 cylinder
6b press-fitting portion
6c clearance
6d guide portion
8 discharge valve mechanism
9 pressure pulsation damping mechanism
30 magnetic suction valve
100 relief valve mechanism

The invention claimed is:
1. A high-pressure fuel pump, comprising:
a pump body which is formed with a pressing chamber; and
a cylinder which is inserted in a hole formed in the pump body, wherein
the cylinder is provided with a convex portion on an outside in a radial direction distal to the pressing chamber,
the convex portion is press-fitted into the hole, and
the cylinder is formed with a clearance in the radial direction with respect to the hole of the pump body, the clearance spanning only from a region from an upper end of the convex portion to an upper end of the cylinder.
2. The high-pressure fuel pump according to claim 1, wherein the clearance is formed to be 0.025 mm or more.
3. The high-pressure fuel pump according to claim 1, wherein the clearance has an even thickness in the radial direction, and the convex portion is formed to protrude outside in the radial direction by 0.0165 mm or more from an outermost diameter portion of the clearance in a lower portion of the clearance.
4. The high-pressure fuel pump according to claim 1, further comprising:
a plunger which slides on an inner diameter side of the cylinder,
wherein, in a state where the plunger is at a maximum distance from the pressing chamber, a concave portion is formed to be dented inward in the radial direction at a position corresponding to the convex portion of the cylinder in an axial direction.
5. The high-pressure fuel pump according to claim 4, wherein the concave portion is formed all around an outer diameter portion of the plunger.
6. The high-pressure fuel pump according to claim 1, wherein an end of the convex portion inward in the radial direction is formed in a lower end of the hole of the pump body, an upper surface of the end of the convex portion comes into contact with a lower surface of the clearance of the cylinder, and a movement to a lower direction of the cylinder is restricted.
7. The high-pressure fuel pump according to claim 1, wherein the clearance has an even thickness in the radial direction, and is formed such that a length in an axial direction of the convex portion becomes 0.34 to 0.41 times that in an axial direction of the clearance.
8. The high-pressure fuel pump according to claim 1, wherein the clearance has an even thickness in the radial direction and a small diameter portion having a thickness smaller than that in the radial direction of the clearance, and is formed such that a length in an axial direction of the small diameter portion becomes 0.94 to 1.01 times that in an axial direction of the clearance.
9. The high-pressure fuel pump according to claim 1, wherein the clearance has an even thickness in the radial direction and a small diameter portion having a smaller thickness in the radial direction than the thickness of the clearance, and is formed such that a thickness in the radial direction of the small diameter portion becomes 0.34 to 0.40 times that in the radial direction of the clearance.
10. The high-pressure fuel pump according to claim 1, wherein the convex portion is disposed on a lower side from a center position in an axial direction where the cylinder faces the hole of the pump body.
11. A high-pressure fuel pump, comprising:
a pump body which is formed with a pressing chamber; and
a cylinder which is inserted in a hole formed in the pump body, wherein
the cylinder is swaged to the hole by pressing a convex portion on an outside in a radial direction to fit into the hole on side distal to the pressing chamber, by screwing a formed screw thread into the hole, or by being swaged with the side distal to the pressing chamber, the cylinder is formed with a clearance in the radial direction with respect to the hole of the pump body all over a region from the convex portion to an end of the pump body adjacent to the pressing chamber, and the clearance is formed to be 0.025 mm or more.

12. The high-pressure fuel pump according to claim 11, wherein the clearance has an even thickness in the radial direction, and the convex portion is formed to protrude outside in the radial direction by 0.0165 mm or more from an outermost diameter portion of the clearance in a lower portion of the clearance.

13. The high-pressure fuel pump according to claim 11, further comprising:

a plunger which slides on an inner diameter side of the cylinder, wherein, in a state where the plunger is at a maximum distance from the pressing chamber, a concave portion is formed to be dented inward in the radial direction at a position corresponding to the convex portion of the cylinder in an axial direction.

14. The high-pressure fuel pump according to claim 13, wherein the concave portion is formed all around an outer diameter portion of the plunger.

15. The high-pressure fuel pump according to claim 11, wherein an end of the convex portion inward in the radial direction is formed in a lower end of the hole of the pump body, an upper surface of the end of the convex portion comes into contact with a lower surface of the clearance of the cylinder, and a movement to a lower direction of the cylinder is restricted.

16. The high-pressure fuel pump according to claim 11, wherein the clearance has an even thickness in the radial direction, and is formed such that a length in an axial direction of the convex portion becomes 0.34 to 0.41 times that in an axial direction of the clearance.

17. The high-pressure fuel pump according to claim 11, wherein the clearance has an even thickness in the radial direction and a small diameter portion having a thickness smaller than that in the radial direction of the clearance, and is formed such that a length in an axial direction of the small diameter portion becomes 0.94 to 1.01 times that in an axial direction of the clearance.

18. The high-pressure fuel pump according to claim 11, wherein the clearance has an even thickness in the radial direction and a small diameter portion having a smaller thickness in the radial direction than the thickness of the clearance, and is formed such that a thickness in the radial direction of the small diameter portion becomes 0.34 to 0.40 times that in the radial direction of the clearance.

19. The high-pressure fuel pump according to claim 11, wherein the convex portion is disposed on a lower side from a center position in an axial direction where the cylinder faces the hole of the pump body.

20. A high-pressure fuel pump, comprising:

a pump body which is formed with a pressing chamber; and a cylinder which is inserted in a hole formed in the pump body, wherein the cylinder is swaged to the hole by pressing a convex portion on an outside in a radial direction to fit into the hole on side distal to the pressing chamber, by screwing a formed screw thread into the hole, or by being swaged with the side distal to the pressing chamber, the cylinder is formed with a clearance in the radial direction with respect to the hole of the pump body all over a region from the convex portion to an end of the pump body adjacent to the pressing chamber, and the clearance has an even thickness in the radial direction, and the convex portion is formed to protrude outside in the radial direction by 0.0165 mm or more from an outermost diameter portion of the clearance in a lower portion of the clearance.

* * * * *